(12) United States Patent
Padiyar et al.

(10) Patent No.: US 11,539,796 B2
(45) Date of Patent: Dec. 27, 2022

(54) SYSTEM FOR INTELLIGENT SENSOR DATA TRANSFER AND DEVICE MANIPULATION LEVERAGING QUANTUM OPTIMIZATION ENGINE

(71) Applicant: BANK OF AMERICA CORPORATION, Charlotte, NC (US)

(72) Inventors: Sneha Padiyar, Maharashtra (IN); Shailendra Singh, Maharashtra (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 239 days.

(21) Appl. No.: 16/923,301

(22) Filed: Jul. 8, 2020

(65) Prior Publication Data
US 2022/0014589 A1 Jan. 13, 2022

(51) Int. Cl.
*H04L 67/12* (2022.01)
*G06N 10/00* (2022.01)
*G16Y 40/35* (2020.01)

(52) U.S. Cl.
CPC ............. *H04L 67/12* (2013.01); *G06N 10/00* (2019.01); *G16Y 40/35* (2020.01)

(58) Field of Classification Search
CPC ........ G16Y 40/35; H04L 67/12; G06N 10/00; G06N 20/00; G06N 10/60; G06N 5/025
See application file for complete search history.

(56) References Cited

U.S. PATENT DOCUMENTS

| | | | |
|---|---|---|---|
| 9,451,031 B2* | 9/2016 | Graziano | G05D 23/1905 |
| 2012/0093160 A1* | 4/2012 | Tonsing | H04L 47/12 370/392 |
| 2016/0342906 A1* | 11/2016 | Shaashua | H04L 67/12 |
| 2017/0006135 A1 | 1/2017 | Siebel et al. | |
| 2018/0302440 A1* | 10/2018 | Hu | H04L 63/1441 |
| 2018/0308000 A1* | 10/2018 | Dukatz | G06N 20/00 |
| 2019/0342179 A1* | 11/2019 | Barnard | H04L 41/082 |
| 2019/0347560 A1 | 11/2019 | Jaiswal et al. | |
| 2020/0327371 A1* | 10/2020 | Sharma | H04L 67/34 |
| 2021/0042314 A1* | 2/2021 | Batlle | G06F 16/212 |
| 2021/0234769 A1* | 7/2021 | Ganapathi | H04L 41/16 |
| 2021/0279625 A1* | 9/2021 | Shani | G06F 12/0238 |
| 2021/0334079 A1* | 10/2021 | Gambetta | G06N 10/00 |
| 2022/0028254 A1* | 1/2022 | Ogawa | G08G 1/096775 |

* cited by examiner

*Primary Examiner* — Tonia L Dollinger
*Assistant Examiner* — Linh T. Nguyen
(74) *Attorney, Agent, or Firm* — Moore & Van Allen PLLC; R. W. McCord Rayburn

(57) ABSTRACT

A system for intelligent data transfer is provided. The system is configured to: collect sensor data from a plurality of user devices, the plurality of user devices being connected to a device gateway in an edge layer of the network; combine the collected sensor data with contextual data stored in a contextual device database, wherein the contextual data comprises device usage data and user data; generate a data transfer rule set for governing data transfer from the plurality of user devices over the network based on the combined data; calculate a data configuration flow for the plurality of user devices based on the data transfer rule set; and execute the data configuration flow to control a flow of the sensor data transferred from the device gateway to an application server in a platform layer.

20 Claims, 9 Drawing Sheets

SYSTEM FOR INTELLIGENT SENSOR DATA TRANSFER AND DEVICE MANIPULATION LEVERAGING QUANTUM OPTIMIZATION ENGINE

BACKGROUND

Network-enabled devices having sensors and actuators for performing conditional functions are increasingly implemented in products for various reasons across multiple industries. With the growing number of network-enabled devices, data traffic demands over networks have also increased, wherein networked devices having different priorities, and sometimes interlinked relationships, are competing with one another for efficient use of network bandwidth and resources. As such, there exists a need for an improved data transfer system for intelligently optimizing the caching and processing of data over a network between a plurality of sensor devices and a receiving platform layer application.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system for intelligent data transfer is provided. The system comprises: a memory device with computer-readable program code stored thereon; a communication device connected to a network; a processing device, wherein the processing device is configured to execute the computer-readable program code to: collect sensor data from a plurality of user devices, the plurality of user devices being connected to a device gateway in an edge layer of the network; combine the collected sensor data with contextual data stored in a contextual device database, wherein the contextual data comprises device usage data and user data; generate a data transfer rule set for governing data transfer from the plurality of user devices over the network based on the combined data; calculate a data configuration flow for the plurality of user devices based on the data transfer rule set; and execute the data configuration flow to control a flow of the sensor data transferred from the device gateway to an application server in a platform layer.

In one specific embodiment, the system further comprises a quantum optimization engine configured for calculating the data configuration flow for the plurality of user devices, wherein the sensor data collected form the plurality of user devices and the contextual data is processed in parallel simultaneously by the quantum optimization engine.

In another embodiment, the contextual data further comprises user interaction patterns, device usage duration data, and device usage location data.

In yet another embodiment the system further comprises a machine learning engine, wherein the machine learning engine is configured for receiving the combined data and generating the data transfer rule set based on the combined data.

In yet another embodiment, the processing device is further configured to execute the computer-readable program code to group the plurality of user devices based on the data transfer rule set and the data configuration flow, wherein the sensor data from the grouped user devices is transferred to the application server together. In yet another embodiment, the sensor data from the grouped user devices is transferred from the device gateway to an application server across a shared data channel.

In yet another embodiment, executing the data configuration flow comprises controlling the flow of the sensor data over a number of data channels.

In yet another embodiment, the processing device is further configured to execute the computer-readable program code to: determine a priority of each of the plurality of user devices; and calculate the data configuration flow based on the priority of each of the plurality of user devices, wherein an order of the sensor data transferred to the application server is based on the priority of each of the plurality of user devices.

In yet another embodiment, at least one the plurality of user devices comprises an actuator configured to execute an action, and wherein the processing device is further configured to execute the computer-readable program code to: transmit a command from the application server in the platform layer to the device gateway in the edge layer; and execute the command via the actuator of the at least one of the plurality of user devices.

A computer-implemented method for intelligent data transfer is also provided. The computer-implemented method comprises: collecting sensor data from a plurality of user devices, the plurality of user devices being connected to a device gateway in an edge layer of a network; combining the collected sensor data with contextual data stored in a contextual device database, wherein the contextual data comprises device usage data and user data; generating a data transfer rule set for governing data transfer from the plurality of user devices over the network based on the combined data; calculating a data configuration flow for the plurality of user devices based on the data transfer rule set; and executing the data configuration flow to control a flow of the sensor data transferred from the device gateway to an application server in a platform layer.

In one specific embodiment, a quantum optimization engine is configured for calculating the data configuration flow for the plurality of user devices, wherein the sensor data collected form the plurality of user devices and the contextual data is processed in parallel simultaneously by the quantum optimization engine.

In another embodiment, the contextual data further comprises user interaction patterns, device usage duration data, and device usage location data.

In yet another embodiment, a machine learning engine is configured for receiving the combined data and generating the data transfer rule set based on the combined data.

In yet another embodiment, the computer-implemented method further comprises grouping the plurality of user devices based on the data transfer rule set and the data configuration flow, wherein the sensor data from the grouped user devices is transferred to the application server together. In yet another embodiment, the sensor data from the grouped user devices is transferred from the device gateway to an application server across a shared data channel.

In yet another embodiment, executing the data configuration flow comprises controlling the flow of the sensor data over a number of data channels.

In yet another embodiment, the computer-implemented method further comprises: determining a priority of each of the plurality of user devices; and calculating the data configuration flow based on the priority of each of the plurality of user devices, wherein an order of the sensor data transferred to the application server is based on the priority of each of the plurality of user devices.

In yet another embodiment, at least one the plurality of user devices comprises an actuator configured to execute an action, and wherein the computer-implemented method further comprises: transmitting a command from the application server in the platform layer to the device gateway in the edge layer; and executing the command via the actuator of the at least one of the plurality of user devices.

A computer program product for intelligent data transfer is also provided. The computer program product comprises a non-transitory computer-readable medium comprising computer-readable instructions, the computer-readable instructions, when executed by a processing device, cause the processing device to: collect sensor data from a plurality of user devices, the plurality of user devices being connected to a device gateway in an edge layer of a network; combine the collected sensor data with contextual data stored in a contextual device database, wherein the contextual data comprises device usage data and user data; generate a data transfer rule set for governing data transfer from the plurality of user devices over the network based on the combined data; calculate a data configuration flow for the plurality of user devices based on the data transfer rule set; and execute the data configuration flow to control a flow of the sensor data transferred from the device gateway to an application server in a platform layer.

In one specific embodiment, a quantum optimization engine is configured for calculating the data configuration flow for the plurality of user devices, wherein the sensor data collected form the plurality of user devices and the contextual data is processed in parallel simultaneously by the quantum optimization engine.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
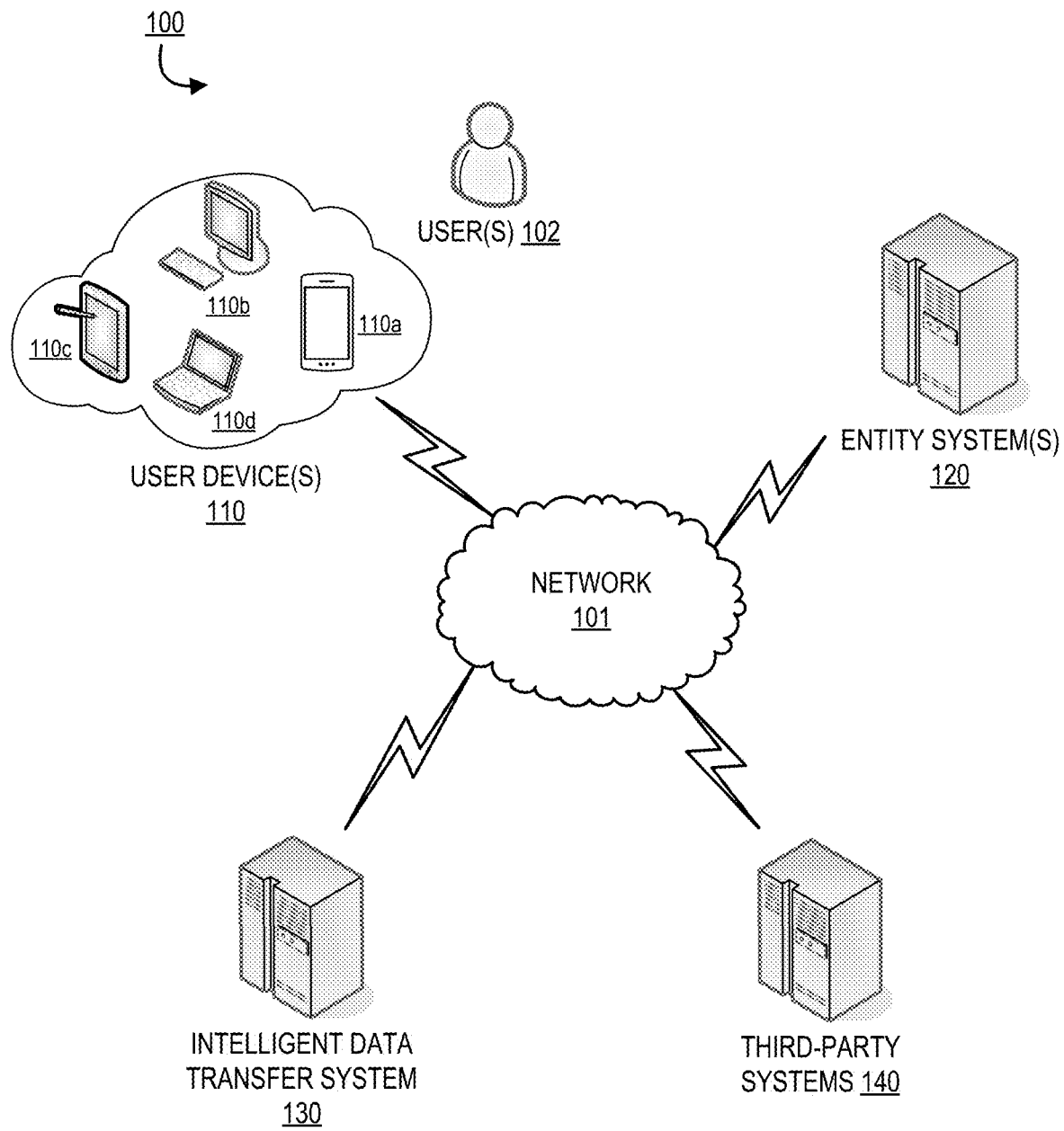
Figure 2:
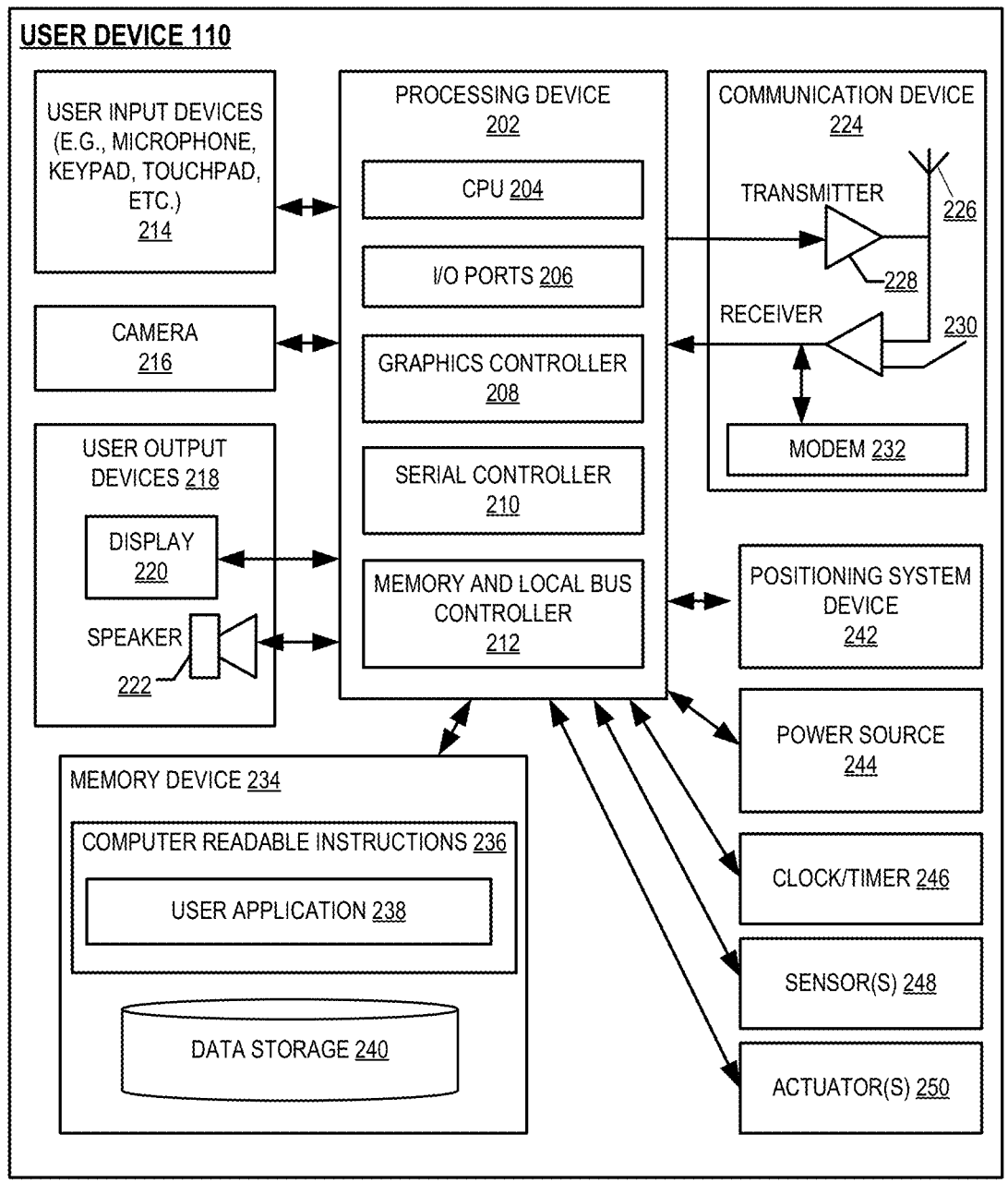
Figure 3:
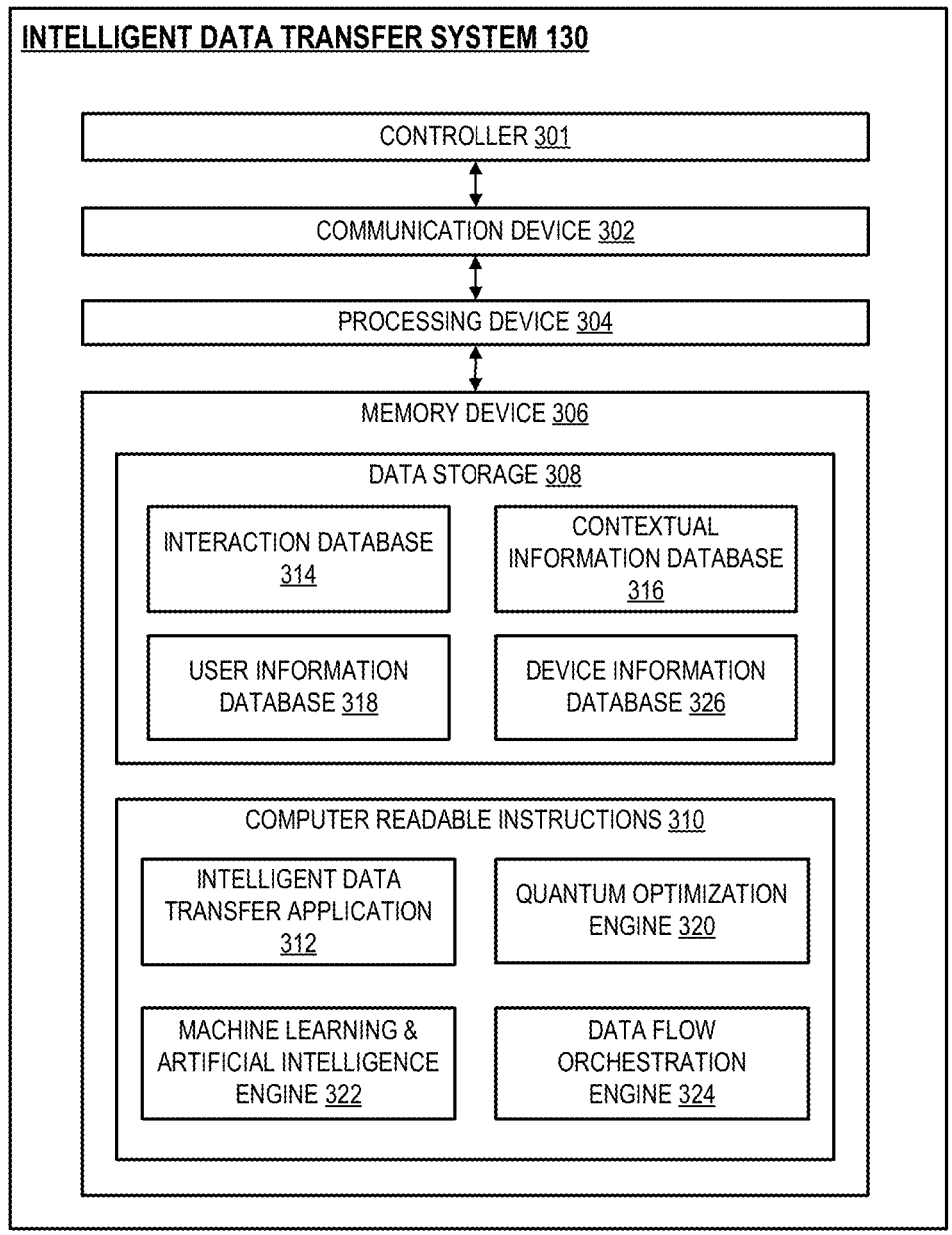
Figure 4:
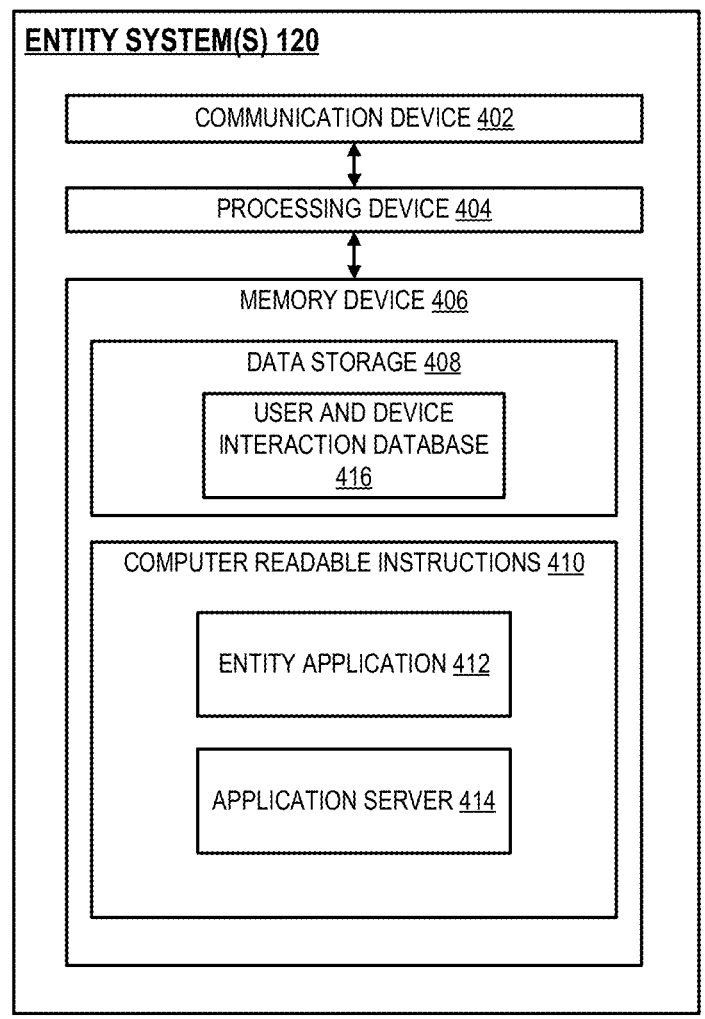
Figure 5:
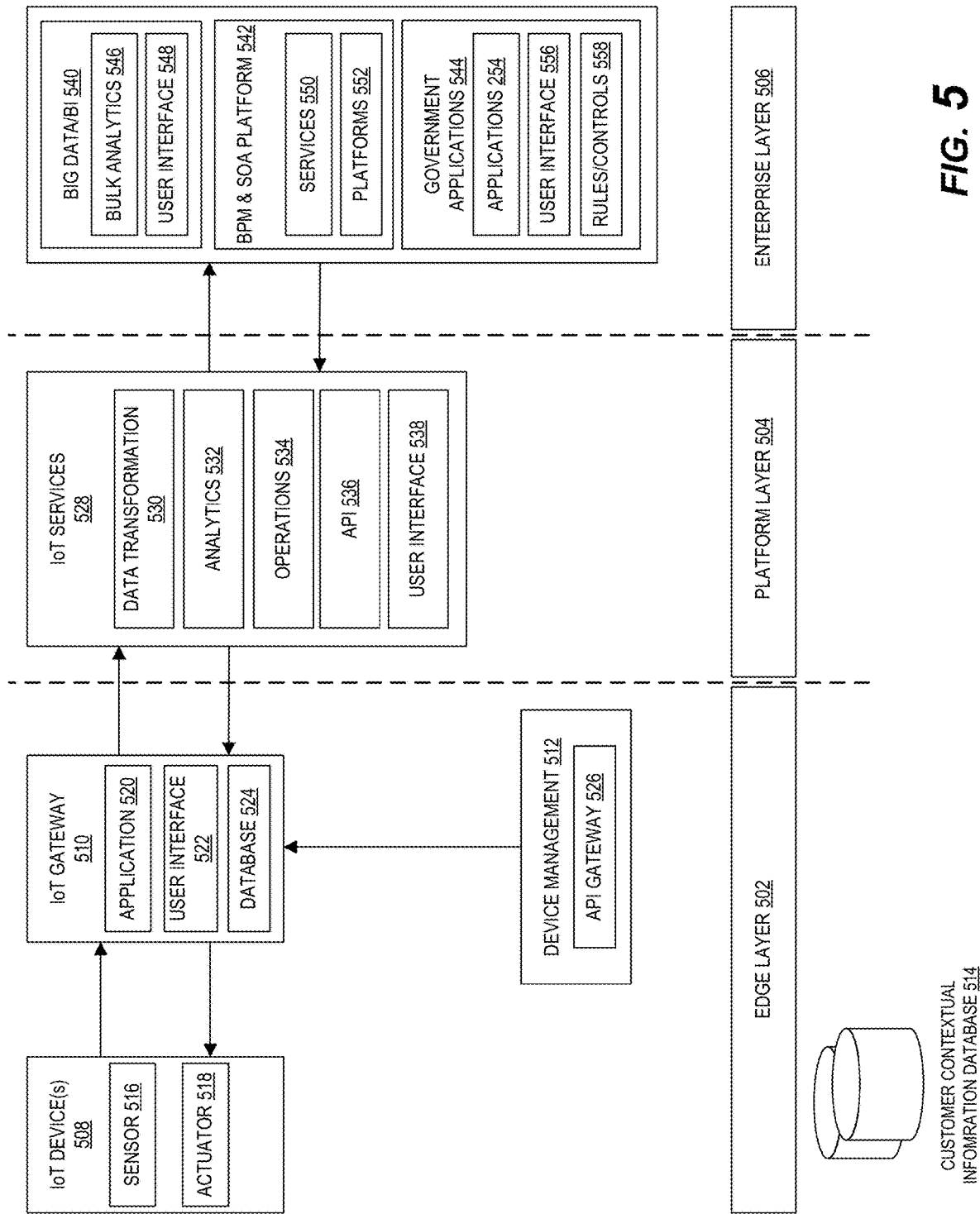
Figure 6:
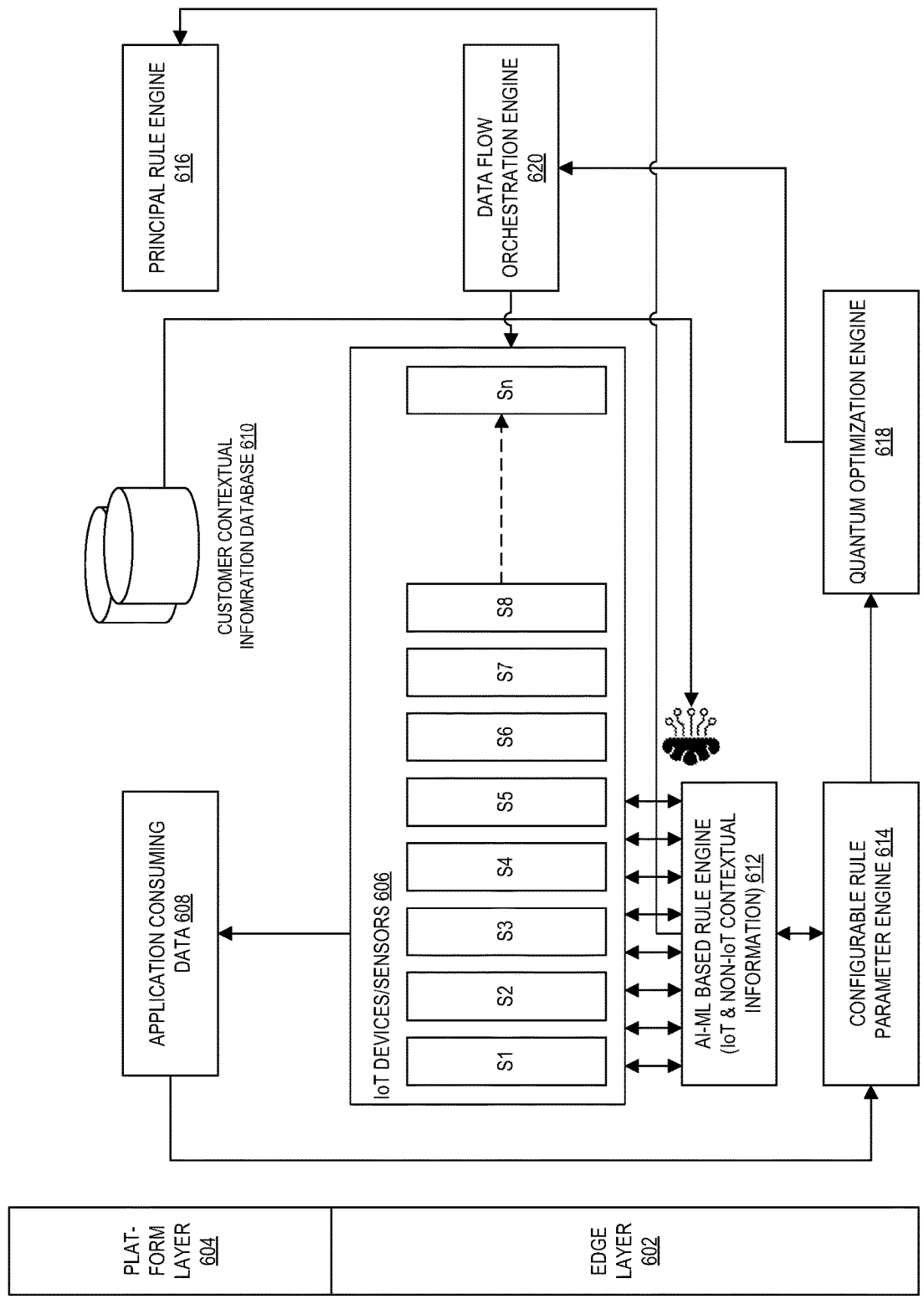
Figure 7:
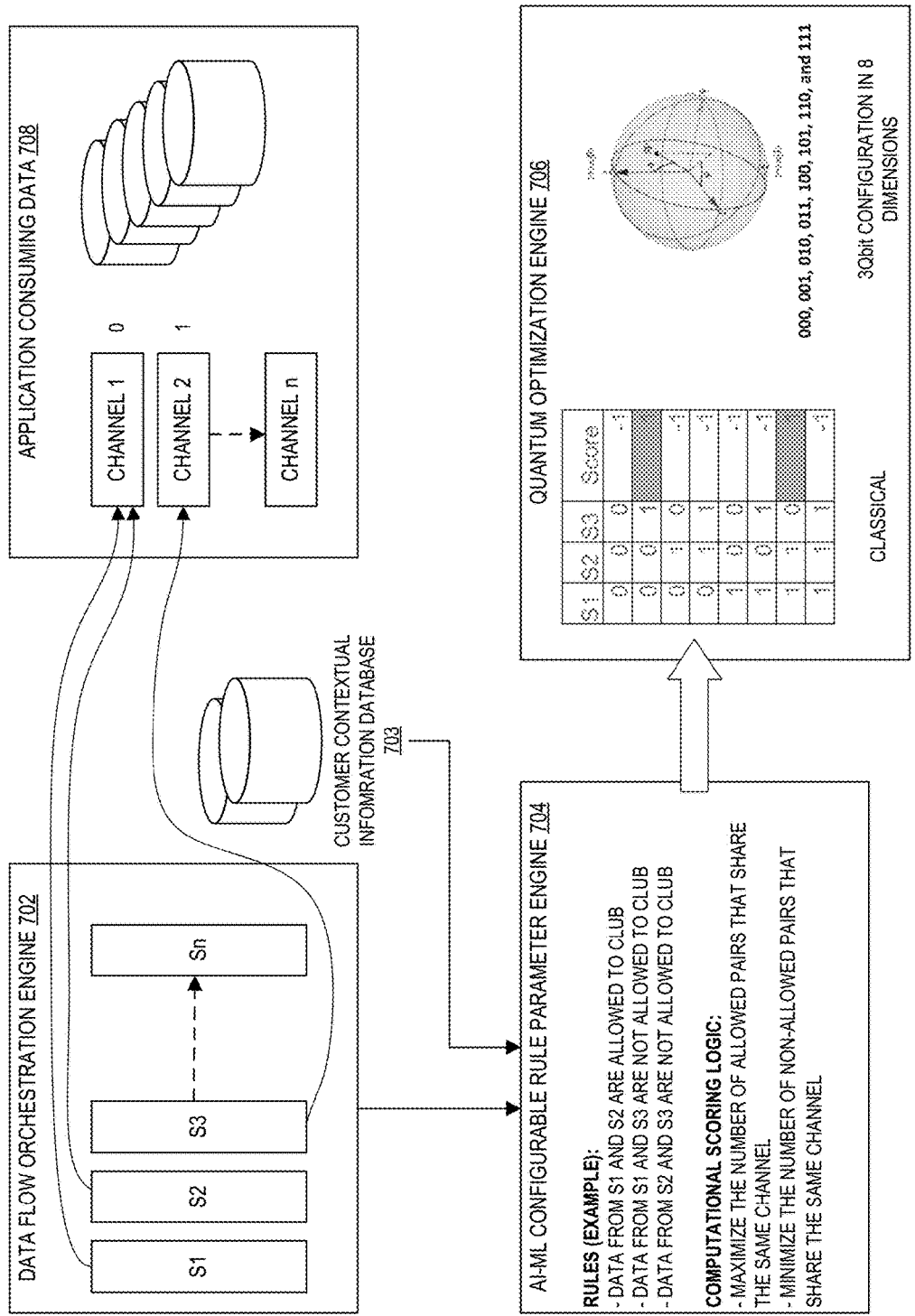
Figure 8:
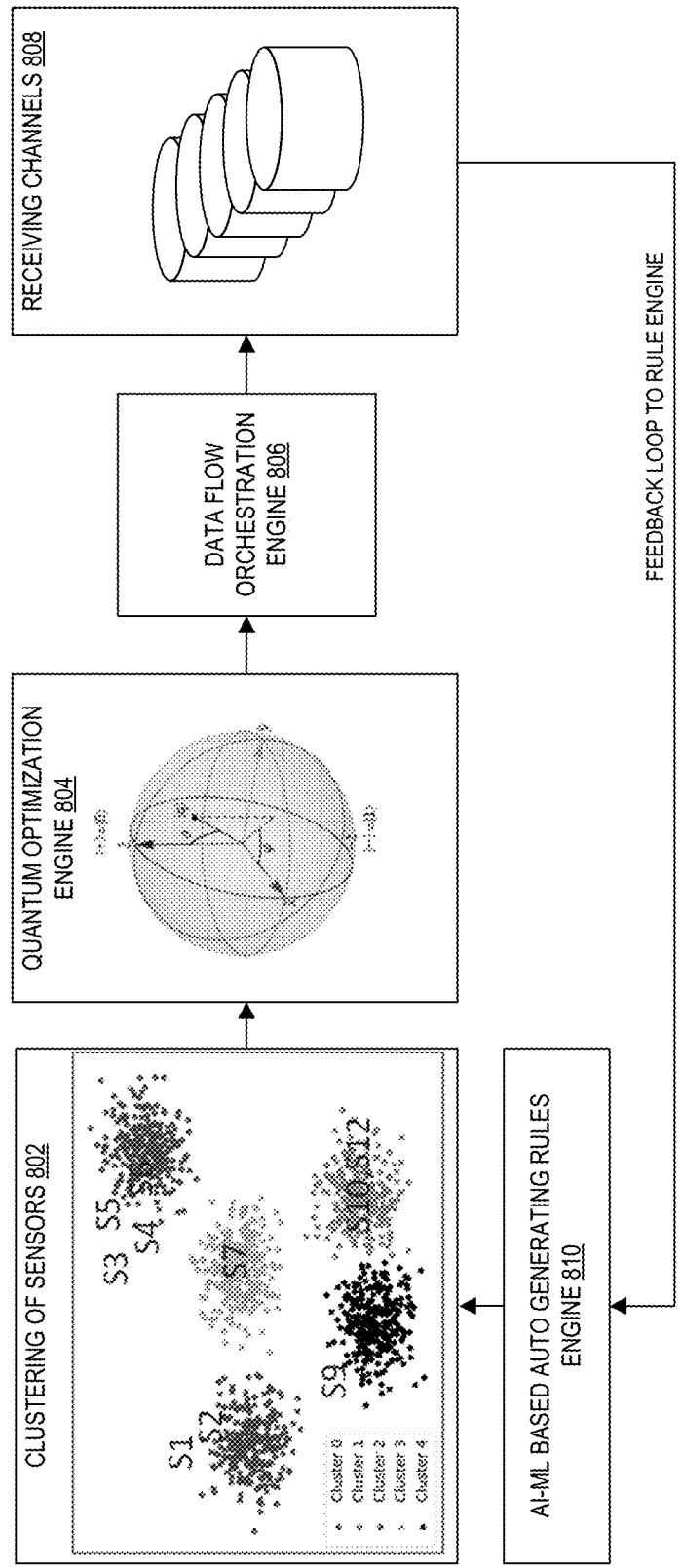
Figure 9:
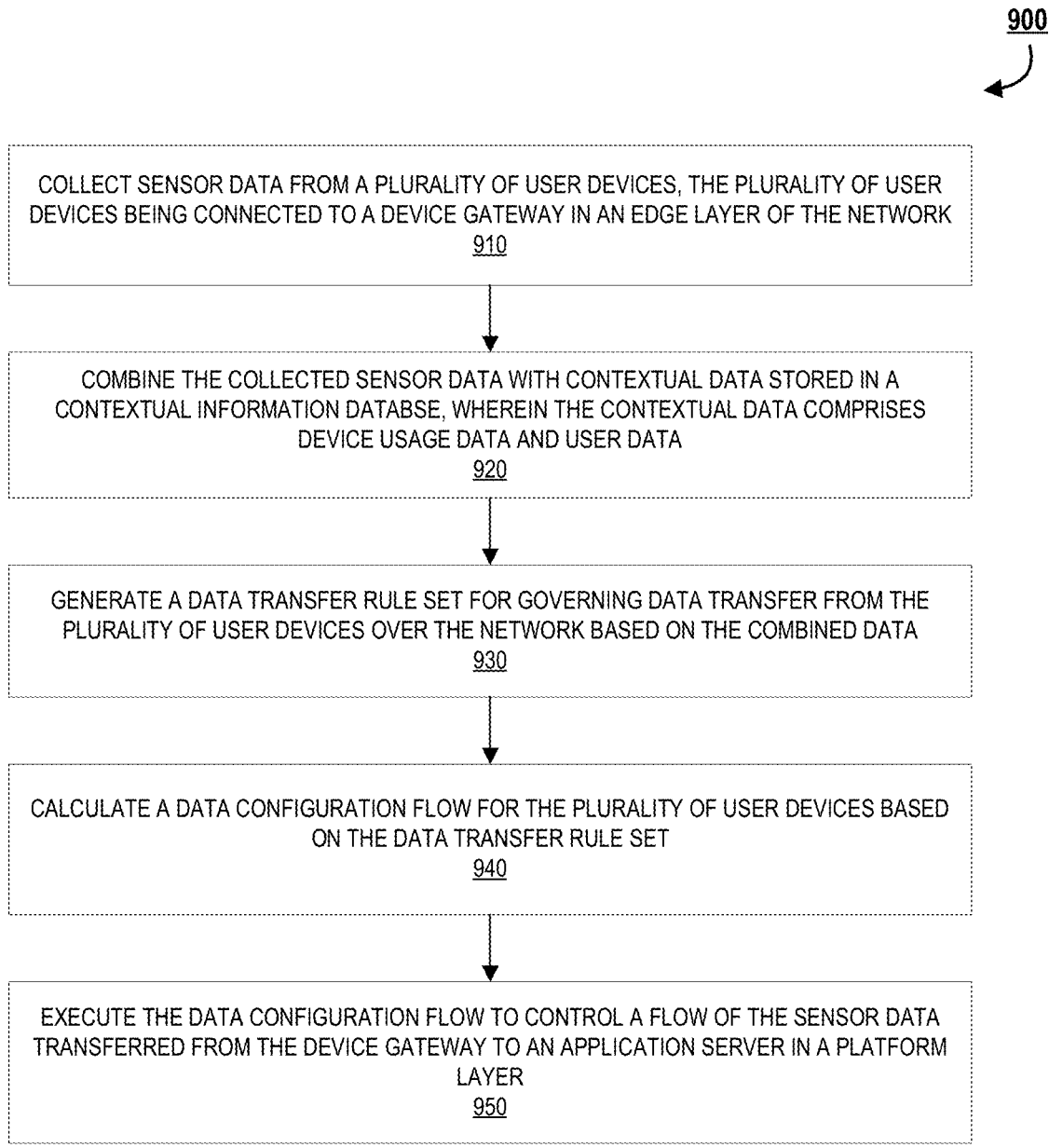

Having thus described embodiments of the invention in general terms, reference will now be made to the accompanying drawings, wherein:

FIG. 1 provides an intelligent data transfer system environment, in accordance with one embodiment of the invention;

FIG. 2 provides a block diagram of a user device, in accordance with one embodiment of the invention;

FIG. 3 provides a block diagram of an intelligent data transfer system, in accordance with one embodiment of the invention;

FIG. 4 provides a block diagram of an entity system, in accordance with one embodiment of the invention;

FIG. 5 provides an illustration of a distributed edge computing configuration within a distributed network environment, in accordance with one embodiment of the invention;

FIG. 6 provides an illustration of an edge computing configuration, in accordance with one embodiment of the invention;

FIG. 7 provides a flow diagram for intelligent data transfer and device manipulation utilizing a quantum optimization engine, in accordance with one embodiment of the invention;

FIG. 8 provides a flow diagram of sensor clustering and reconfiguration via a quantum optimization engine and data flow orchestration engine for optimized use of data channels, in accordance with one embodiment of the invention; and FIG. 9 provides a high level process flow for executing intelligent data transfer, in accordance with one embodiment of the invention.

DETAILED DESCRIPTION OF EMBODIMENTS OF THE INVENTION

The system of the invention is configured to intelligently control and orchestrate network communication between an edge layer comprising a plurality of network-enabled devices and a platform layer comprising an application server for said devices. Generally, the plurality of network-enabled devices forms an Internet-of-Things (IoT) style environment having respective application servers in a physical server or, preferably, a cloud environment. Due to the potential for a large number of connected devices requiring use of a limited number of data channels, the present invention intelligently prioritizes, orchestrates, and optimizes data transfer from the plurality of devices to the platform layer (i.e., the cloud) based on device data from the device and/or associated sensors themselves as well as contextual information associated with the device and/or user.

The present invention is configured to collect data from the plurality of connected devices. The networked-enabled or "connected" devices comprise sensors for determining environmental conditions or performed actions associated with the devices as well as actuators for performing actions in response. This sensor data and other device data is collected and merged with a database of contextual data stored by the system. The system leverages the contextual data to provide reasoning for use of certain devices such as usage times, durations, locations, and the like. Device sensor data and contextual data is processed by a machine learning-based rule engine which is configured to prioritize data transfers from particular devices and generate automatic rules for governing said transfers. For example, the system may group or club certain data together based on the machine learning analysis of the device and contextual information. In some embodiments, these clustered groups of device data may be transferred together by the system to maximize efficient use of available data channels. In some embodiments, the system leverages a quantum optimization engine to generate the aforementioned optimized data configuration flows from the networked devices to the platform layer application servers.

In a specific embodiment, the system may be configured to identify and prioritize devices based on analyzed device data and contextual data, wherein data is initially collected and analyzed by the system, intelligently grouped, and sent to a platform and/or enterprise layer for additional processing where additional actions or updates for the devices may be transmitted back to the devices based on the intelligent analysis. For example, the system may identify an IoT environment of connected devices comprising a connected alarm clock for a user having a scheduled flight. In response to determining a change in a departure time for the flight from a third party airline system, the system of the invention may be configured to automatically update a wake time for the connected alarm clock as well as other devices or systems having data transfers grouped together or related to the alarm clock and or modified flight time in some way (e.g., connected coffee maker, lights in a house, third party shuttle or transportation service websites or applications). In another specific embodiment, the system may be configured to oversee sensors and security devices within an automated teller machine (ATM) environment, wherein, for example, the system may be configured to optimize data transfer from the various connected devices of the ATM based on contextual information collected from a camera system and/or user interface of the ATM to identify a response appropriate for a user-executed action or change in an environment (e.g., attempted misappropriation, resource withdrawal, service required, etc.).

Embodiments of the invention are directed to improvements to data transfer technology and, in particular, especially as applied in Internet-of-Things (IoT) environment of networked devices in communication with a platform layer application server. The present system is configured to efficiently orchestrate data transfers from a plurality of connected devices over a network to a platform layer application server and then, potentially, to an enterprise layer for additional operations and data processing. The system combines both device data or information from device sensors as well as user contextual information associated with the user actions and device usage to determine optimal data transfer parameters. Devices and/or sensors may be grouped together by the system with similar or related devices based on this information for enhanced data transfer efficiency.

Embodiments of the present invention use quantum computing in nonconventional, unexpected ways by leveraging the quantum algorithm technologies in a quantum optimization engine for analyzing the device and contextual data. The quantum optimization engine is configured to allow for data transfers from a large environment of connected devices to be efficiently calculated and communicated to a platform layer from a device gateway in an edge layer. The use of the quantum optimization engine allows the system to be easily scalable while retaining efficient data processing times as a number of potential networked devices increases. For example, a classical table analysis of the potential configurations become reasonably unfeasible as a number of sensors increases, e.g., 100 sensor devices produce approximately millions of potential configurations to be analyzed. In contrast, the quantum optimization engine is configured to process multiple dimensions of data simultaneously in parallel to determine a probable configuration for faster data processing response times.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "computing resource" may refer to elements of one or more computing devices, networks, or the like available to be used in the execution of tasks or processes. A computing resource may be used to refer to available processing, memory, and/or network bandwidth, data usage or data transfer bandwidth or limits, and/or power of an individual computing device as well a plurality of computing devices that may operate as a collective for the execution of one or more tasks (e.g., one or more computing devices operating in unison). In some embodiments, user resources such as computing resources may include an amount of use-time during which the resources are being utilized by the system and/or other systems and devices described herein.

As used herein, the term "user" may refer to any entity or individual associated with the intelligent data transfer system. In some embodiments, a user may be a computing device user, a phone user, a mobile device application user, a customer of an entity or business (i.e., an interaction provider), a system operator, and/or employee of an entity (e.g., a financial institution). In one embodiment, the user is an individual or customer interacting with one or more devices within the system. In another embodiment, the user is an owner of one or more devices comprising sensors and/or actuators for determining a condition and/or performing an action in response. In another embodiment, a user may be a customer with an associated device accessing a data transfer location associated with another user or entity (e.g., an interaction provider) to complete an interaction. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, ATMs, global positioning system (GPS) devices, entertainment devices, or any combination of the aforementioned. The device may be used by the user to access the system directly or through one or more applications, an online portal, internet browser, virtual private network, or other connection channel. The user device comprises a display for providing a user interface to the user for interacting with an application displayed on the device and presented to the user. In some embodiments, a user device may comprise one or more sensors such as a clock/timer, counter, environmental sensor (e.g., thermometer, barometer, light detector, etc.), camera, location sensor (e.g., GPS), or the like. In some embodiments, a user device may comprise one or more actuators for performing an action in response to a predetermined condition being met or in response to receiving a command signal.

As used herein, the term "entity" may be used to include any organization or collection of users that may interact with the intelligent data transfer system. An entity may refer to a business, company, or other organization that either maintains or operates the system or requests use and accesses the system. In one embodiment, the entity may be a business or financial entity. The terms "financial institution" and "financial entity" may be used to include any organization that processes financial transactions including, but not limited to, banks, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution. In some embodiment, an entity may be a business, vendor, or the like that provides a resource (e.g., goods, services, or other resources) to another user or entity via an interaction at an interaction location (e.g., within an application, a web site, brick-and-mortar location).

As used herein, "authentication information" may refer to any information that can be used to authenticate an identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. In some embodiments, authentication information may refer to any information provided by a user, entity, or the like to verify an identify and/or status of the user, entity, or the like.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise analyzing one or more data channels with one or more devices or application servers. In another specific embodiment, monitoring may include analyzing data transferred between a gateway device in an edge layer and an application server in a platform layer of a network. Monitoring of user data streams is performed by the system with approval or authorization by the monitored user device and user.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted through use interaction with a data stream (e.g., in real-time). In some embodiments, an interaction comprises a data transfer between devices or locations within the environment of the system described herein. For example, an interaction may require a transfer of data between a gateway device in an edge layer and an application server in a platform layer of a network.

In some embodiments, an interaction may further include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views and/or transfers, etc.) and the like. In another example, an interaction may refer to a user communication via one or more channels (i.e., phone, email, text, instant messaging, brick-and-mortar interaction, and the like) with an entity and/or entity system to complete an operation or perform an action. In yet another embodiment, an interaction may include any change in an environment as sensed by a user device. In yet another embodiment, an interaction may include any determination of completion or modification of one or more response actions configured for triggering a further action (e.g., via a device actuator).

FIG. 1 provides an intelligent data transfer system environment 100, in accordance with one embodiment of the invention. As illustrated in FIG. 1, intelligent data transfer system 130 is operatively coupled, via a network 101, to the user device(s) 110 (e.g., a plurality of user devices 110a-110d), the entity system(s) 120, and third party systems 140. In this way, the intelligent data transfer system 130 can send information to and receive information from the user device 110, the entity system 120, and the third party systems 140. In the illustrated embodiment, the plurality of user devices 110a-110d provide a plurality of communication channels through which the entity system 120 and/or the intelligent data transfer system 130 may communicate with the user 102 over the network 101.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, as discussed herein, the network 101 may be a distributed network comprising an edge layer, a platform layer, and/or an enterprise layer.

In some embodiments, the user 102 is an individual interacting with one or more user devices either actively or passively, wherein the user devices are configured to transfer data via a gateway device to an application server in a platform layer. In one embodiment, the data stream may be generated or modified, for example, by one or more entity systems 120 while the data stream between the user device 110 and the entity system 120 is monitored by the intelligent data transfer system 130 over the network 101. In an alternative embodiment, the user 102 is an individual interacting with the intelligent data transfer system 130 over the network 101 and monitoring a transfer of data between the user devices 110 and the entity systems 120 using the intelligent data transfer system 130 (e.g., an employee of the entity operating and/or monitoring the systems 120, 130).

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, one or more sensors 248, one or more actuators 250, and the like. In one embodiment, the camera 216 may include a scanner or any other image capturing device. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120 via a user interface. In some embodiments, the user application 238 is an application for interacting with other systems and devices over a network.

The processing device 202 may be configured to use the communication device 224 to communicate with one or more other devices on a network 101 such as, but not limited to the entity system 120 and the intelligent data transfer system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 101. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

FIG. 3 provides a block diagram of an intelligent data transfer system 130, in accordance with one embodiment of the invention. The intelligent data transfer system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, third party systems 140, and/or the intelligent data transfer system 130, in order to interface and manage data flow between devices and systems while executing commands to control the systems. In some embodiments, the controller may be integrated into one or more of the systems described herein. In other embodiments, the controller may be a separate system or device. In some embodiments, the controller may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the intelligent data transfer system 130 comprises computer-readable instructions 310 stored in the memory device 306, which in one embodiment includes the computer-readable instructions 310 of an intelligent data transfer application 312, a quantum optimization engine or application 320, a machine learning and artificial intelligence engine or application 322, and a data flow orchestration engine or application 324. The intelligent data transfer application 312 is configured to monitor and analyze data transferred between the user devices 110 and other systems of the environment. In some embodiments, the intelligent data transfer application 312 collects and combines or merges sensor data from user devices with contextual user and/or device data to be inserted into a rule generator that may leverage machine learning technology. The quantum optimization engine 320 is configured to calculate one or more data configuration flows from a plurality of user devices. The quantum optimization engine 320 is configured to collect and process sensor data and contextual information associated with a plurality of devices simultaneously in parallel to determine an efficient data configuration flow or use of one or more available data channels between the devices and another system such as an application server in a platform layer. The machine learning and artificial intelligence engine 322 is configured receive and analyze device and contextual data and intelligently generate a data transfer rule set based on the analyzed data to control or govern data transfer from the plurality of user devices over the network. The data flow orchestration engine 324 is configured to apply a calculated data configuration flow to a plurality of devices and control a flow of data from an edge layer to a platform layer over a number of data channels.

In some embodiments, the memory device 306 includes data storage 308 for storing data related to the system environment, but not limited to data created and/or used by the intelligent data transfer application 312, quantum optimization engine 320, machine learning and artificial intelligence engine 322, and data flow orchestration engine 324. Data stored in the data storage 308 may comprise an interaction database 314, a contextual information database 316, a user information database 318, and a device information database 326.

The interaction database 314 is used to store information regarding past interactions (e.g., transactions, account actions, device actions or interactions, user communications, etc.) associated with the user 102 and/or one or more user devices 110. In some embodiments, the interaction database 314 may be configured to store data from an incoming data stream in real-time. The interaction database 314 may further include information or data related to the interactions such as user data, user selections, and the like. The system may be configured to access and update stored information and data stored in the interaction database 314 as additional information is collected. The user information database 318 may comprise additional information associated with the user (e.g., identifying information, account information, etc.) and user interactions.

The contextual information database 316 may comprise user information, device information, and/or third party information associated with the usage of one or more devices and or habits or interactions of the user associated with the devices. For example, the contextual information may comprise device usage data (e.g., usage duration, times, locations) and usage patterns associated with use of the devices by a user. The device information database 326 may comprise information and data associated with the one or more user devices such as device identifying information (e.g., product names, product types, product functionality, serial numbers, part numbers, product numbers, network addresses, location information, etc.) and additional usage information. The third party contextual information may comprise, for example, third party information associated with a device (e.g., from a manufacturer system or website), third party data associated with a device or user, data from a third party system that provides a good or service associated with a device or user, and the like.

In one embodiment of the invention, the intelligent data transfer system 130 may associate with applications having computer-executable program code that instruct the processing device 304 to perform certain functions described herein. In one embodiment, the computer-executable program code of an application associated with the user device 110, third party systems 140, and/or the entity systems 120 may also instruct the processing device 304 to perform certain logic, data processing, and data storing functions of the application.

Embodiments of the intelligent data transfer system 130 may include multiple systems, servers, computers or the like maintained by one or many entities. In some embodiments, the intelligent data transfer system 130 may be part of the entity systems 120. In other embodiments, the entity systems 120 are distinct from the intelligent data transfer system 130. The intelligent data transfer system 130 may communicate with the entity systems 120 via a secure connection generated for secure encrypted communications between the two systems either over the network 101 or alternative to the network 101.

As illustrated in detail in FIG. 4, the environment 100 further includes one or more entity systems 120 which are connected to the user device 110, the intelligent data transfer system 130, and the third party systems 140. The entity systems 120 may be associated with one or more entities, institutions, or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412 and an application server 414. The application server 414 may be used to communicate with and at least partially control a response of one or more connected user devices of the environment. The entity systems 120 may communicate with the user device 110, third party systems 140, and the intelligent data transfer system 130 to provide access to information and accounts stored and maintained on the entity systems 120. In some embodiments, the entity system 120 may communicate with the intelligent data transfer system 130 during an interaction with a user 102 in real-time, wherein user interactions may be monitored and processed by the intelligent data transfer system 130. In some embodiments, data storage 408 comprises a user and/or device interaction database 416 to either supplement or replace storage of the intelligent data transfer system 130 as previously discussed.

The systems of the environment 100 are configured to intelligently control and orchestrate network communication between an edge layer comprising a plurality of network-enabled devices and a platform layer comprising an application server for said devices. Generally, the plurality of network-enabled devices forms an IoT-type environment having respective application servers in a physical server or, preferably, a cloud network environment. Due to the potential for a large number of connected devices requiring use of a limited number of data channels, the present invention intelligently prioritizes, orchestrates, and optimizes data transfer from the plurality of devices to the platform layer based on device data from the device and/or associated sensors themselves as well as contextual information associated with the device and/or user. Prioritization of the data by the system may be based on the types of data and/or devices requesting transfer and/or a current demand for network computing resources and available data channels.

The system is configured to collect data from the plurality of connected devices. The networked-enabled devices comprise sensors for determining environmental conditions or performed actions associated with the devices as well as actuators for performing actions in response. This sensor data and other device data is collected and merged with a database of contextual data stored by the system. The system leverages the contextual data to provide reasoning for use of certain devices such as usage times, durations, locations, and the like. Device sensor data and contextual data is processed by a machine learning-based rule engine which is configured to prioritize data transfers from particular devices and generate automatic rules for governing said transfers. For example, the system may group or club certain data together based on the machine learning analysis of the contextual information. In some embodiments, these clustered groups of device data may be transferred together by the system to maximize efficient use of available data channels, prioritize higher priority devices when presented with limited network computing resources for data transfers, and/or meet data security requirements. In some embodiments, the system leverages a quantum optimization engine to generate the aforementioned optimized data configuration flows from the networked devices to the platform layer application servers.

FIG. 5 provides an illustration of a distributed, edge computing configuration within a distributed network environment, in accordance with one embodiment of the invention. In some embodiments, the invention is configured to operate in a distributed network environment described herein. As illustrated in FIG. 5, the network environment comprises an edge layer 502, a platform layer 504, and an enterprise layer 506. The edge layer 502 comprises one or more user devices 508 forming an IoT collection of networked devices. The user devices 508 further comprise one or more sensors 516 and/or actuators 518 for determining environmental conditions and performing response actions respectively as previously discussed. The user devices 508 in the edge layer 502 are configured to collect data from a user and/or a surrounding environment. In some embodiments, the user devices 508 in the edge layer 502 are configured to provide a first level of data processing for the system. The network environment further comprises a user contextual information database 514 which may be located in the edge layer 502 or, in other embodiments, another layer.

The edge layer 502 further comprises an IoT gateway 510 comprising an application 520 configured for user operation in conjunction with a user interface 522 and a database 524 configured for storing data received from the devices 508 and from other layers of the environment. One or more IoT gateways 510 are configured to function as intermediate data centers between the devices 508 of the edge layer 502 and the platform layer 504. The gateway 510 may provide improved data processing and storage capabilities compared to the individual connected devices 508 while still providing a distributed number of midpoints of communication between the devices 508 and platform layer 504. By moving portions of data processing and storage to the edge layer, the gateways 510 provide reduced latency for executed functions and processing able to be performed at the edge layer 502. In some embodiments, the one or more devices 508 comprise the IoT gateway 510. The edge layer 502 further comprises a device management system 512 comprising an API gateway 526 for managing interactions between the software of the various user devices 508 at the IoT gateway 510.

The network environment further includes a platform layer 504 in communication with the gateway 510 of the edge layer 502. The platform layer 504 comprises IoT services or server 528 which is an application server receiving data from the devices 508 and/or gateway 510 of the edge layer 502. IoT server 528 further comprises a data transformation module 530 configured for transforming data transmitted between the edge layer 502 and enterprise layer 506 along with application programming interface 534. The IoT server 528 further comprises an analytics module 532 and an operations module 534 for processing data at the platform layer 504.

The platform layer 504 is in communication with an enterprise layer 506 positioned farthest from the network edge layer 502. The enterprise layer is a centralized data center offering a large density of processing and storage resources. The illustrated enterprise layer 506 comprises a big data module component 540, a business processes management (BPM) and service oriented architecture (SOA) platform component 542, and a government applications component 544. The big data component 540 comprises a bulk analytics module 546 and a user interface 548. The BPM and SOA platform component 542 comprises a services module 550 and a platforms module 552. The government applications component 544 comprises an applications module 554, a user interface 556, and a rules and/or controls module 558. In one embodiment, the enterprise layer 506 is owned and maintained by an entity that maintains the system.

FIG. 6 provides an illustration of an edge computing configuration, in accordance with one embodiment of the invention and described with respect to the process flow of FIG. 9. The illustrated configuration comprises at least an edge layer 602 and a platform layer 604. In some embodiments, the edge layer 602 and the platform layer 604 of FIG. 6 are the edge and platform layers discussed with respected to FIG. 5. The edge layer 602 of FIG. 6 comprises a plurality of networked devices and/or sensors 606, S1-Sn.

The devices and/or sensors 606 are in communication with an artificial intelligence and/or machine learning rule engine 612 which, in turn, is further in communication with a user contextual information database 610 and a principal rule engine 616 in the platform layer 616. The devices 606 are further in communication with an application consuming data or application server 608 in the platform layer 604 which is configured to transmit data back to a configurable rule parameter engine 614 in the edge layer 602. The rule parameter engine 614 is configured to input data to a quantum optimization engine 618 to provide an output decision of an optimized data transfer configuration to a data flow orchestration engine 620 to execute the optimized data transfer to and/or from the sensors 606.

FIG. 7 provides a flow diagram for intelligent data transfer and device manipulation utilizing a quantum optimization engine and described with respect to the process flow of FIG. 9, in accordance with one embodiment of the invention. Data from a collection of sensors, S1-Sn, and user contextual information data 703 are input into an AI-ML configurable rule parameter engine 704, wherein a number of predetermined rules and computational scoring logic are generated. The generated rules, device data, and contextual data are input to the quantum optimization engine 706, wherein an optimized configuration of the sensors or devices, S1-Sn, according to the generated rules and logic is calculated in parallel through simultaneous computation of applicable dimensions as opposed to a typical, purely classical approach. The configuration is output back to the data flow orchestration engine 702, wherein the sensors, S1-Sn, are modified to provide data flow through an optimal configuration of sensors and data channels to an application consuming data 708 in a platform layer. FIG. 8 provides a flow diagram of sensor clustering 802 and reconfiguration via a quantum optimization engine 804 and data flow orchestration engine 806 for optimized use of data channels 808. Feedback is provided to the AI-ML based autogenerating rules engine 510 continuously.

FIG. 9 provides a high level process flow for executing intelligent data transfer, in accordance with one embodiment of the invention. In some embodiments, the process flow of FIG. 9 is executed or performed by the system leveraging the environments of the previous figures. As illustrated at block 910 of FIG. 9, the system is configured to first collect sensor data from a plurality of user devices, the plurality of user devices being connected to a device gateway in an edge layer of the network. The user devices comprise sensors configured for determining one or more detectable changes, conditions, or actions in an environment in which the device and/or sensor is placed or positioned. An environment may comprise a physical environment such as a room of a house, a geographic location, or the like. In some embodiments, an environment may comprise a network location. Device sensors may comprise any device configured to detecting an environmental condition such as, but not limited to, a clock/timer, counter, environmental sensor (e.g., thermometer, barometer, light detector, etc.), camera, location sensor (e.g., GPS), or the like. In some embodiments, a user device may further comprise one or more actuators, motors, pumps, or the like for performing an action in response to a predetermined condition being met or in response to receiving a command signal.

At block 920, the system is configured to combine the collected sensor data with contextual data stored in a contextual information database. The contextual data comprises device usage data and user data such as, for example, user interaction patterns, device usage duration data, and device usage location data (e.g., GPS data, network location data). In a specific non-limiting example, contextual data associated with a particular user device may include a location of use; an amount of time that the device was used by the user; a record of the specific times that the device was used; other devices used by the user at the same time or within a predetermined amount of time of using the original or primary device; actions taken by the user, device, or other components of the system in response to or coinciding with use of the device; and the like.

In some embodiments, the system is configured to initially prioritize the devices and/or sensors based on the contextual information. For example, the system may determine a higher priority for data transfer or network traffic from a first device compared to a second device based on the contextual information. In some embodiments, the system is configured to generate and store a contextual based mapping of the ecosystem of IoT connected devices based on the collected sensor data, wherein the mapping stores user device relationships determined by the system based on the contextual information. The contextual based mapping of the connected devices may be used by the system to initially group and prioritize data transfers from one or more of the user devices. Alternatively, the system may decide to temporarily cache data associated with lower priority devices for a delayed data transfer following the higher priority devices.

At block 930, the system is configured to generate a data transfer rule set for governing data transfer from the plurality of user devices over the network based on the combined data. In one embodiment, to generate the data transfer rule set, the system comprises a machine learning engine. The machine learning engine is configured for receiving and analyzing the combined user, device, and contextual data and generating the data transfer rule set based on an analysis of the combined data. In some embodiments, the data transfer rule set defines a configuration of the devices and/or associated data for transferring said data from the edge layer to the platform layer via the IoT device gateway over available data channels. In some embodiments, the data transfer rule set generated by the machine learning engine may comprise an initial rule set to be further optimized by the system. In one embodiment, the system may group a plurality of user devices into multiple groups or clubs to transfer data associated with the groups of devices together based on device type, data type, sensor type, device priority, data size, data security level, or the like. In some embodiments, the data transfer rule set provides predetermined guidelines for which transferred data or device employ a shared data channel and which data or devices are restricted from sharing data channels. In some embodiments, data transfer rules may be initially set by a maintaining entity or from a previously executed data transfer and stored in a principal rule database.

At block 940, the system is configured to calculate a data configuration flow for the plurality of user devices based on the data transfer rule set. In one embodiment, the system comprises a quantum optimization engine configured for processing the sensor data collected from the plurality of user devices and the contextual data. The quantum optimization engine is further configured for calculating the data configuration flow for a plurality of user devices. The data configuration flow is an optimized organization of data to be transferred over one or more data channels from the devices and gateway of the edge layer to the platform layer. The quantum optimization engine receives the initial data transfer rule set along with the data itself and processes this information to determine an optimal flow of data from the devices. The quantum optimization engine is configured to utilize one or more quantum algorithms to determine a configuration based on the input. Non-limiting examples of quantum algorithms utilized by the system include Fourier transform-based algorithms, amplitude amplification-based algorithms, quantum walk-based algorithms, and the like. In one embodiment, the system is configured to employ a hybrid quantum/classical algorithm.

The quantum optimization engine is leveraged to allow for data transfers from a large environment of connected devices to be efficiently calculated and communicated to a platform layer from a device gateway in an edge layer. The use of the quantum optimization engine allows the system to be easily scalable while retaining efficient data processing times as a number of potential networked devices increases. For example, a purely classical table analysis of the potential configurations become reasonably unfeasible as a number of sensors increases, e.g., 100 sensor devices produce approximately millions of potential configurations. In contrast, the quantum optimization engine is configured to process multiple dimensions of data simultaneously in parallel to determine a probable configuration for faster processing times.

At block 950, the system is configured to execute the data configuration flow to control a flow of the sensor data transferred from the device gateway to an application server in a platform layer. In one embodiment, the system is configured to output the calculated data configuration flow from the quantum optimization engine to a data flow orchestration engine. The data flow orchestration engine is configured to execute the data configuration flow by applying the configuration to the available data channels to control the flow of data from the various devices and/or IoT gateway to an application server in the platform layer or cloud.

In one specific embodiment, the system is configured to group user devices based on the data transfer rule set and the data configuration flow, wherein the sensor data from the grouped user devices is transferred to the application server together. In other embodiments, the system is configured to transmit a portion of data (e.g., high priority data) and not transmit another portion of data (e.g., lower priority data), wherein the data that is not transmitted is instead temporarily cached for later processing or transmission. In this way, the system intelligently optimizes which data is transferred over the network for additional processing in the platform layer and which data is cached for offline processing to save data transfer cost and processing power of the application server.

In the exemplary embodiment discussed with respect to FIG. 7, the machine learning engine 704 receives the combined data from the sensors S1-Sn and the customer contextual information database 703. Based on the received combined data, the machine learning engine 704 is configured to generate a data rule set comprising rules and computational scoring logic to be input to the quantum optimization engine 706. In some embodiments, the rules and/or logic may be provided to the engine 704 as an initial starting point or recommendation. In the specific example of FIG. 7, the machine learning engine 704 comprises the rules of clubbing or grouping data from sensors S1 and S2 while prohibiting sensor S3 from clubbing with either sensors S1 or S2. Additionally, the machine learning engine 704 comprises the scoring logic of maximizing the number of allowed pairs that share the same data channel and minimizing the number of non-allowed pairs that share the same data channel. The system is configured to construct and execute a data configuration flow based on the determined rules and logic. Next, the generated rules and logic are input to the quantum optimization engine 706, wherein a data flow configuration from the sensors (S1, S2, S3) is calculate using a quantum algorithm to process the potential configurations in parallel as opposed to a purely classical approach. A calculated solution is applied to the sensors and data channels using the data flow orchestration engine 702.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for intelligent data transfer, the computer-implemented method comprising:
    collecting sensor data from a plurality of user devices, the plurality of user devices being connected to a device gateway in an edge layer of a network;
    combining the collected sensor data with contextual data stored in a contextual information database, wherein the contextual data comprises device usage data and user data;
    generating a data transfer rule set for governing data transfer from the plurality of user devices over the network based on the combined data;
    calculating, using a quantum optimization engine, a data configuration flow for the plurality of user devices based on the data transfer rule set; and
    executing the data configuration flow to control a flow of the sensor data transferred from the device gateway to an application server in a platform layer;
    wherein the sensor data collected from the plurality of user devices and the contextual data is processed in parallel simultaneously by the quantum optimization engine.

2. The computer-implemented method of claim 1, wherein the contextual data further comprises user interaction patterns, device usage duration data, and device usage location data.

3. The computer-implemented method of claim 1, wherein a machine learning engine is configured for receiving the combined data and generating the data transfer rule set based on the combined data.

4. The computer-implemented method of claim 1 further comprising grouping the plurality of user devices based on the data transfer rule set and the data configuration flow, wherein the sensor data from the grouped user devices is transferred to the application server together.

5. The computer-implemented method of claim 4, wherein the sensor data from the grouped user devices is transferred from the device gateway to the application server across a shared data channel.

6. The computer-implemented method of claim 1, wherein executing the data configuration flow comprises controlling the flow of the sensor data over a number of data channels.

7. The computer-implemented method of claim 1 further comprising:
    determining a priority of each of the plurality of user devices; and
    calculating the data configuration flow based on the priority of each of the plurality of user devices, wherein an order of the sensor data transferred to the application server is based on the priority of each of the plurality of user devices.

8. The computer-implemented method of claim 1, wherein at least one the plurality of user devices comprises an actuator configured to execute an action, and wherein the computer-implemented method further comprises:
    transmitting a command from the application server in the platform layer to the device gateway in the edge layer; and
    executing the command via the actuator of the at least one of the plurality of user devices.

9. A system for intelligent data transfer, the system comprising:
    a memory device with computer-readable program code stored thereon;
    a communication device connected to a network;
    a quantum optimization engine; and
    a processing device, wherein the processing device is configured to execute the computer-readable program code to:
        collect sensor data from a plurality of user devices, the plurality of user devices being connected to a device gateway in an edge layer of the network;
        combine the collected sensor data with contextual data stored in a contextual information database, wherein the contextual data comprises device usage data and user data;
        generate a data transfer rule set for governing data transfer from the plurality of user devices over the network based on the combined data;
        calculate, using the quantum optimization engine, a data configuration flow for the plurality of user devices based on the data transfer rule set; and execute the data configuration flow to control a flow of the sensor data transferred from the device gateway to an application server in a platform layer;

wherein the sensor data collected from the plurality of user devices and the contextual data is processed in parallel simultaneously by the quantum optimization engine.

10. The system of claim 9, wherein the contextual data further comprises user interaction patterns, device usage duration data, and device usage location data.

11. The system of claim 9 further comprising a machine learning engine, wherein the machine learning engine is configured for receiving the combined data and generating the data transfer rule set based on the combined data.

12. The system of claim 9, wherein the processing device is further configured to execute the computer-readable program code to group the plurality of user devices based on the data transfer rule set and the data configuration flow, wherein the sensor data from the grouped user devices is transferred to the application server together.

13. The system of claim 12, wherein the sensor data from the grouped user devices is transferred from the device gateway to the application server across a shared data channel.

14. The system of claim 9, wherein executing the data configuration flow comprises controlling the flow of the sensor data over a number of data channels.

15. The system of claim 9, wherein the processing device is further configured to execute the computer-readable program code to:
determine a priority of each of the plurality of user devices; and
calculate the data configuration flow based on the priority of each of the plurality of user devices, wherein an order of the sensor data transferred to the application server is based on the priority of each of the plurality of user devices.

16. The system of claim 9, wherein at least one the plurality of user devices comprises an actuator configured to execute an action, and wherein the processing device is further configured to execute the computer-readable program code to:
transmit a command from the application server in the platform layer to the device gateway in the edge layer; and
execute the command via the actuator of the at least one of the plurality of user devices.

17. A computer program product for intelligent data transfer, wherein the computer program product comprises a non-transitory computer-readable medium comprising computer-readable instructions, the computer-readable instructions, when executed by a processing device, cause the processing device to:
collect sensor data from a plurality of user devices, the plurality of user devices being connected to a device gateway in an edge layer of a network;
combine the collected sensor data with contextual data stored in a contextual information database, wherein the contextual data comprises device usage data and user data;
generate a data transfer rule set for governing data transfer from the plurality of user devices over the network based on the combined data;
calculate, using a quantum optimization engine, a data configuration flow for the plurality of user devices based on the data transfer rule set; and
execute the data configuration flow to control a flow of the sensor data transferred from the device gateway to an application server in a platform layer;
wherein the sensor data collected from the plurality of user devices and the contextual data is processed in parallel simultaneously by the quantum optimization engine.

18. The computer program product of claim 17, wherein the contextual data further comprises user interaction patterns, device usage duration data, and device usage location data.

19. The computer program product of claim 17, the computer-readable instructions, when executed by the processing device, cause the processing device to:
receive, using a machine learning engine, the combined data; and
generate, using the machine learning engine, the data transfer rule set based on the combined data.

20. The computer program product of claim 17, wherein the computer-readable instructions, when executed by the processing device, cause the processing device to group the plurality of user devices based on the data transfer rule set and the data configuration flow, wherein the sensor data from the grouped user devices is transferred to the application server together.

* * * * *